(12) United States Patent
Shu

(10) Patent No.: US 7,092,248 B2
(45) Date of Patent: Aug. 15, 2006

(54) DETACHABLE MODULAR COMPUTER

(76) Inventor: Paul Shu, 41300 Boyce Rd., Fremont, CA (US) 94538

( * ) Notice: Subject to any disclaimer, the term of this patent is extended or adjusted under 35 U.S.C. 154(b) by 105 days.

(21) Appl. No.: 10/767,935

(22) Filed: Jan. 28, 2004

(65) Prior Publication Data

US 2005/0162822 A1   Jul. 28, 2005

(51) Int. Cl.
*G06F 1/16*   (2006.01)
(52) U.S. Cl. .................... 361/683; 361/681; 312/223.1
(58) Field of Classification Search ........ 361/683–686, 361/724–727; 312/223.1, 223.2
See application file for complete search history.

(56) References Cited

U.S. PATENT DOCUMENTS

| | | | | |
|---|---|---|---|---|
| 3,425,025 A | * | 1/1969 | Williams | 439/347 |
| 4,401,351 A | * | 8/1983 | Record | 439/61 |
| 4,501,460 A | * | 2/1985 | Sisler | 361/683 |
| 4,680,674 A | * | 7/1987 | Moore | 361/681 |
| 4,734,874 A | * | 3/1988 | Hwang et al. | 361/682 |
| 4,893,263 A | * | 1/1990 | Myers | 361/684 |
| 5,097,388 A | * | 3/1992 | Buist et al. | 361/683 |
| 5,131,272 A | | 7/1992 | Minei et al. | |
| 5,187,643 A | | 2/1993 | I-Shou | |
| 5,329,427 A | | 7/1994 | Hogdahl | |
| 6,028,764 A | | 2/2000 | Richardson et al. | |
| 6,118,663 A | * | 9/2000 | Fan | 361/683 |
| 6,147,862 A | | 11/2000 | Ho | |
| 6,216,185 B1 | | 4/2001 | Chu | |
| 6,377,446 B1 | | 4/2002 | Liau | |
| 6,480,374 B1 | * | 11/2002 | Lee | 361/683 |
| 2003/0090866 A1 | | 5/2003 | Kuo | |
| 2003/0156383 A1 | | 8/2003 | Jenkins et al. | |

* cited by examiner

*Primary Examiner*—Lisa Lea-Edmonds
(74) *Attorney, Agent, or Firm*—GSS Law Group; Earl Jennings

(57) ABSTRACT

A computer is formed by two detachable modules that are electrically connected by a separable electrical connector assembly whose two respective socket-plug mating members are mounted on respective opposing mating surfaces of the two modules. The opposing electrical connector members are disposed on the opposing surfaces to be electrically and physically mated when the connectors are aligned and the two mating surfaces are in proximal contact. In some embodiments of the invention, computer functions are physically segmented into functionally differentiated modules (display function, processor function, memory function, etc.). Segmented computer functions are characterized by a measure of a reliability characteristic and segregated into one or another of the separable modules according to the rank order of the reliability characteristic measures. In another embodiment, the segregation is based on the likelihood a component will be upgraded.

6 Claims, 6 Drawing Sheets

DETACHABLE MODULAR COMPUTER

FIELD OF INVENTION

The present invention relates generally to the field of computer systems. More particularly, the present invention relates to computers configured as separable modules.

DESCRIPTION OF RELATED ART

Computers find applications in industrial and commercial environments in which a computer or a number of computers are installed in association with equipment for purposes of controlling or monitoring the equipment. Such computers are typically configured with some type of display unit, a keyboard or other input device, and some form of housing incorporating the other computer functions: typically a microprocessor, memory, disk storage devices, connectors for peripheral devices, etc. A desktop computer traditionally comprises a relatively large rectangular central processing unit (CPU) housing within which the motherboard, various drives, input/output devices, and other components of the computer are housed. Additionally, a complete functional desktop computer includes a monitor such as a cathode ray tube (CRT) display or a liquid crystal display (LCD), and further includes a keyboard, a mouse, speakers, and so forth. In typical portable computers, the keyboard and computer electronics are incorporated in a base unit wherein a display device such as a liquid crystal display (LCD) is attached to the base unit with a permanent hinge mechanism forming a configuration referred to as a "clam shell" housing. Most portable computer available today utilize the "clam shell" configuration.

Some desktop computers have a display panel hinged at a lower edge to a supporting pedestal or base unit that houses the other computer functions (e.g., processor, RAM and fixed disk storage and peripheral cards). The base unit typically has peripheral ports for connections to the keyboard, mouse, joystick, etc., on the back surface and access openings to internal hard disk and floppy drives on the front or sides. The hinged panel allows the display to be tilted forward and back for more convenient viewing under different conditions.

Recent developments in small desktop or portable computers exhibit a modular architecture to provide advantages of a portable or notebook computer design, while incorporating an enclosure structure which is weatherproof and resistant to mechanical shock, while also being adaptable to desktop applications, i.e., a structure which optimizes the design goals of both portable and desktop designs by providing a modular computer design which may be used in a portable mode or on a desktop, either with or without a keyboard.

Display modules for portable computers have been described that attempt to achieve compactness by integrating the display detachably onto the base or pedestal computing unit. This can provide easier and faster computer maintenance and repair (less down time) by quickly replacing a defective display panel.

What is needed is detachable modular computer wherein the computer includes one or more of the following features: (1) separate computer functions having similar reliability measures are collected into separate modules having similar reliability characteristics, (2) easy removal and replacement of non-functioning modules is possible, (3) computer maintenance is thereby simplified, (4) computer down-time caused by non-operational computer functions is reduced, (5) the simultaneous electrical and mechanical engagement of the electrical sockets and fasteners of two connecting modules is accomplished with a simple single axis motion, e.g. no twisting, sliding or multi-axis motion is required to position the modules to be locked together.

BRIEF DESCRIPTION OF THE DRAWINGS

A preferred embodiment of the present invention is further described in connection with the accompanying drawings, in which.

DETAILED DESCRIPTION OF THE INVENTION

The following description is provided to enable any person skilled in the art to make and use the invention and sets forth the best mode presently contemplated by the inventors of carrying out the invention. Various modifications, however, will remain readily apparent to those skilled in the art, as generic principles of the present invention have been defined herein.

The present invention relates generally to computers configured as separable modules. In accord with the invention is described an improved method and apparatus for easily and rapidly detaching and attaching separable modules which may be differentiated from each other by disparate reliability characteristics, e.g., Mean-Time-to-Failure.

Figure 1:
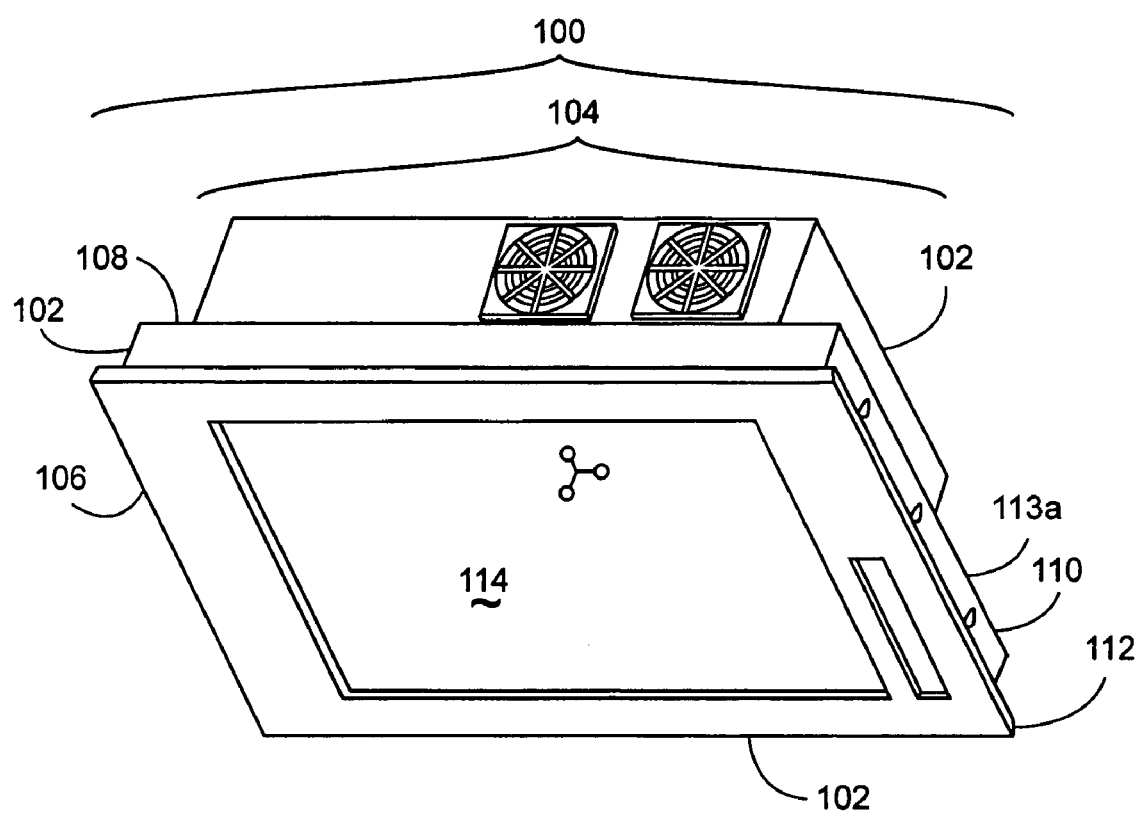
FIG. 1 shows an example embodiment of a computer built in accord with the invention including a detachable display module and a detachable processor module.
Figure 2:
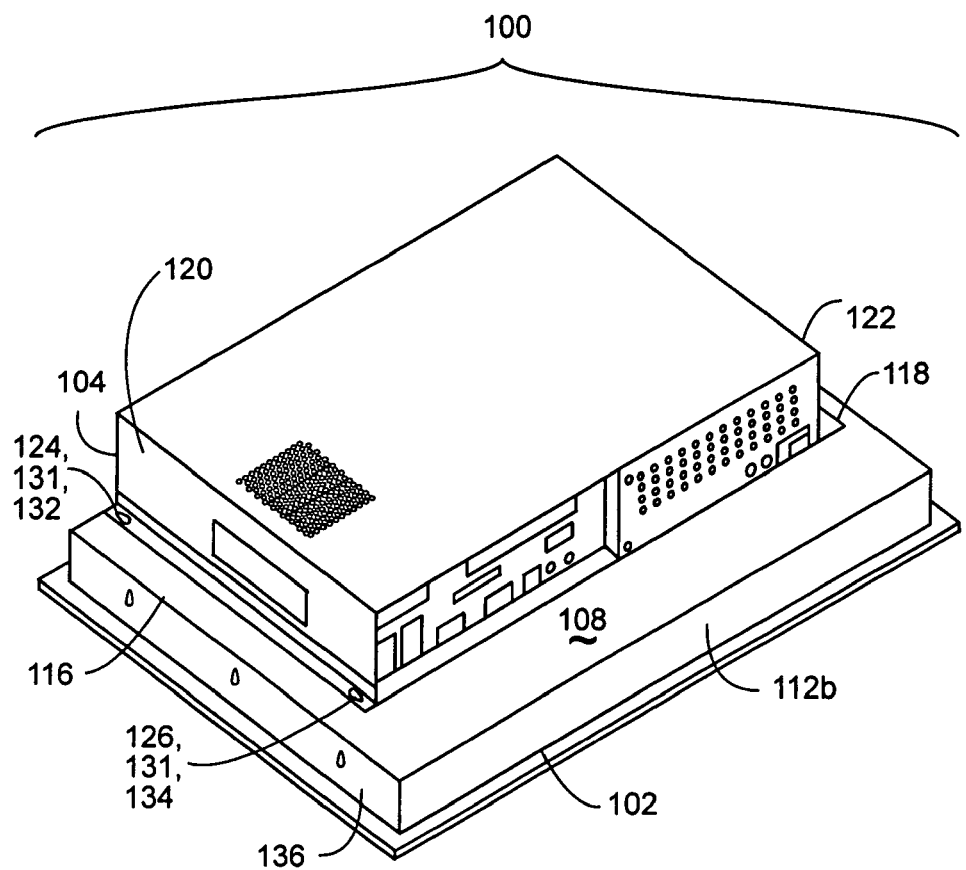
FIG. 2 shows a back perspective view of the computer of FIG. 1.

An example embodiment of the invention is seen generally in the FIGS. 1–6 wherein a modular computer with uniaxial detachable module is shown in frontal and posterior perspective views in FIG. 1 and FIG. 2, respectively. The modular computer 100 is assembled from two separable modules mounted together: a display module 102 and a detachable processor module 104. The display module 102 is enclosed by an anterior panel 106 and a spaced apart, opposite facing, posterior panel 108 and an exterior lateral frame 110 that extends around the display module along the lateral periphery between the anterior and posterior panels. The exterior frame 110 defines four contiguous lateral display module panels: an opposite pair of spaced apart upper and lower lateral panels 112a and 112b, joined at respective opposing ends by a corresponding opposite pair of spaced apart lateral side panels 113a and 113b.

An LCD display panel 114 for viewing the visual display output of computer 100 is defined within the boundary of the anterior surface of the display module.

The processor module 104 is positioned and aligned to the posterior display module panel 108 so that two spaced apart mounting flanges 116 and 118 extending from the proximal edges of opposite lateral side panels 120 and 122 of the processor module are in proximal contact with the display module posterior surface 108. Four spaced apart threaded screw holes 124, 126, 128 and 130 (only screw holes 124 and 126 visible in FIG. 2) are defined in the display module posterior panel 108 and positioned to receive mounting screws 131 through spaced apart flange apertures 132, 134, 136 and 138 defined in mounting flanges 116 and 118 (apertures 136, 138 not visible in FIG. 2)

Figure 3:
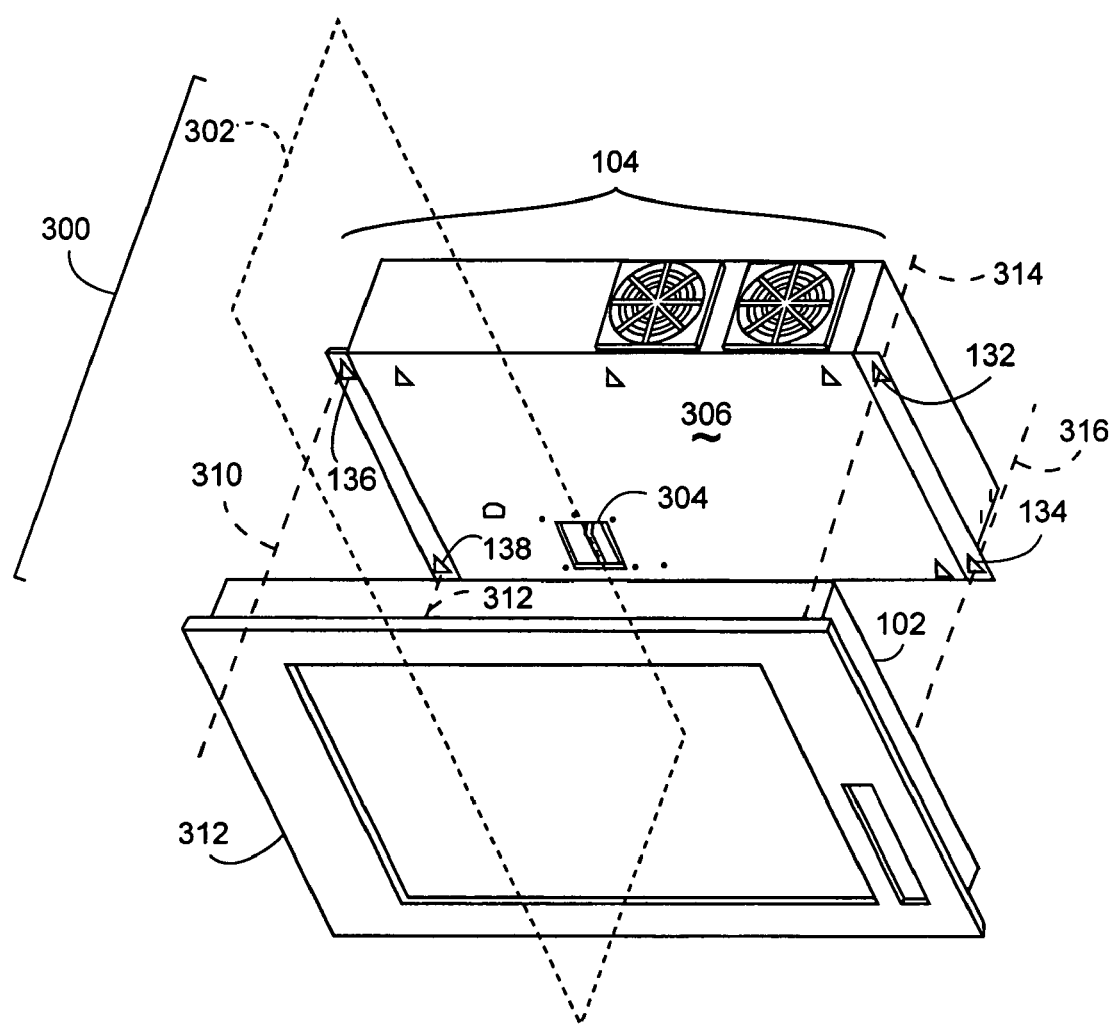
FIG. 3 shows a perspective view of the display module and processor module separated and aligned for mounting.

Referring now to FIG. 3 in combination with FIG. 1 and FIG. 2, the display module and processor module are show in a disengaged, aligned relationship 300 ready for mounting and electrical connection with each other. The processor module is separated from the display module along an aligning engagement plane 302 passing perpendicular through the display module anterior and posterior panels and perpendicular through a first electrical connection socket assembly 304 fixed to a frontal panel 306 of the processor module.

The planar processor module mounting flanges 116, 118 are disposed parallel with and proximal to processor module frontal panel 306 so that the frontal processor module panel is proximal and planar to the posterior display module panel 108 when the processor module is mounted to the display module.

A plurality of spaced apart, electrically isolated first electrical contacts (not shown) in the socket 304 are positioned and aligned so that each one of the first electrical contacts make separate electrical connection with corresponding spaced apart, electrically isolated receiving electrical contacts (not shown) positioned and aligned in a receiving electrical socket assembly (shown below) that is fixed in a aligned receiving position (shown below) on the processor module posterior panel. The processor module flanges and flange apertures are positioned relative to the processor module socket so that, with the processor module socket assembly 306 positioned and aligned with the display module socket assembly along engagement plane 302, the processor module flange apertures 132–138 are positioned perpendicular to and aligned with the respective receiving screw hole apertures 510–514 (shown below) defined in the display module posterior panel. The alignment of the flange apertures and respective screw holes preparatory to mounting, is indicated by respective spaced apart, parallel dashed alignment lines 310, 312, 314, 316.

Electrical and physical connection or disconnection between the processor module and the display module requires merely a uniaxial motion of the two modules, along the engagement plane 302, toward or away from contact of the two aligned sockets and the simultaneous contact of the aligned flange apertures and respective receiving screw holes.

Insertion and tightening of mounting screws through the flange apertures into the receiving screw holes, locks the processor module to the display module in fixed physical and electrical connection, enabling the joined modules to function as the intended computer 100.

Figure 4:
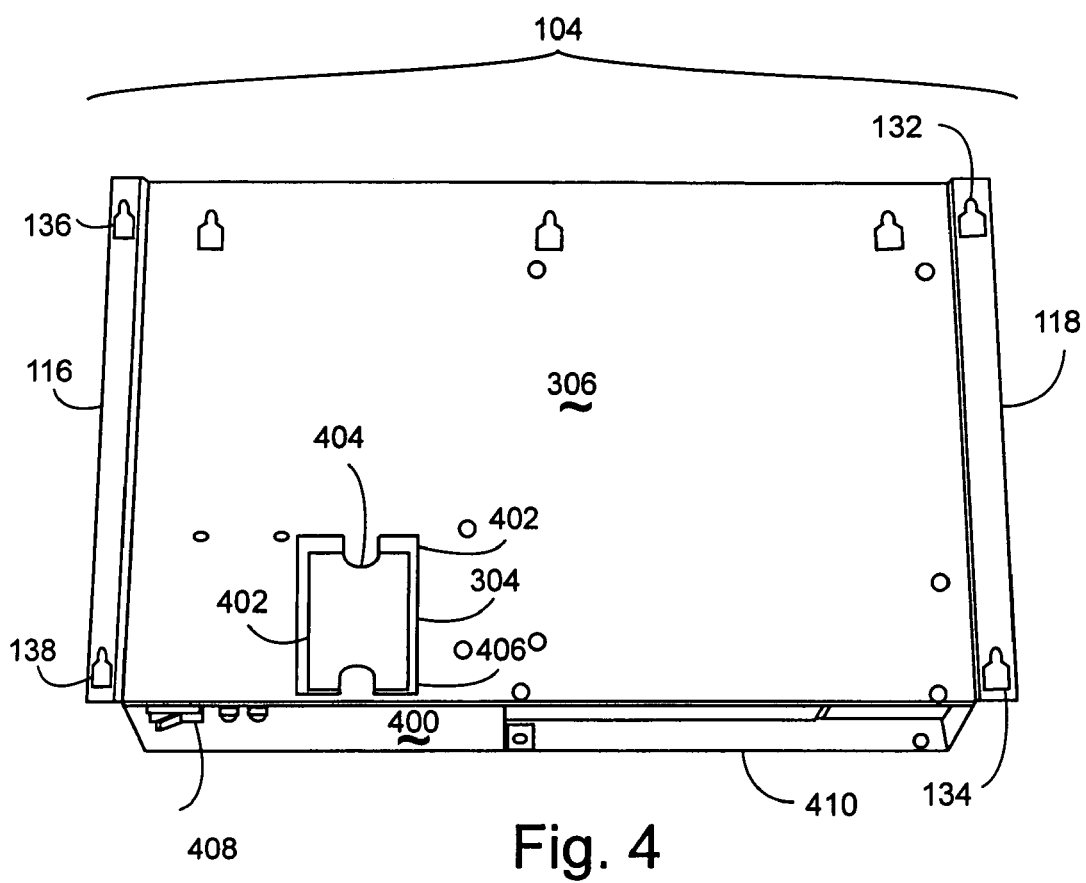
FIG. 4 shows a front view of the processor module.

FIG. 4 is a perspective view of the processor module showing two orthogonal exterior panels of the processor module enclosure: the frontal panel 306 and a lower lateral exterior panel 400. The frontal panel defines a socket aperture 402 formed therethrough. A connector PC board 404 is mounted within aperture 402 by screws connected to two panel tabs 406 at opposite edges of the socket aperture 402. The processor module socket assembly 304 is mounted to the connector PC board 404 and positioned and aligned relative to the flange apertures 132–138 so that it aligns with the display module socket assembly mounted on the display module posterior panel 108 when the flange apertures are aligned with the processor module mounting screw holes.

In this embodiment, the lower panel 400 includes a power switch and indicator light assembly 408 and peripheral sockets 410.

Figure 5:
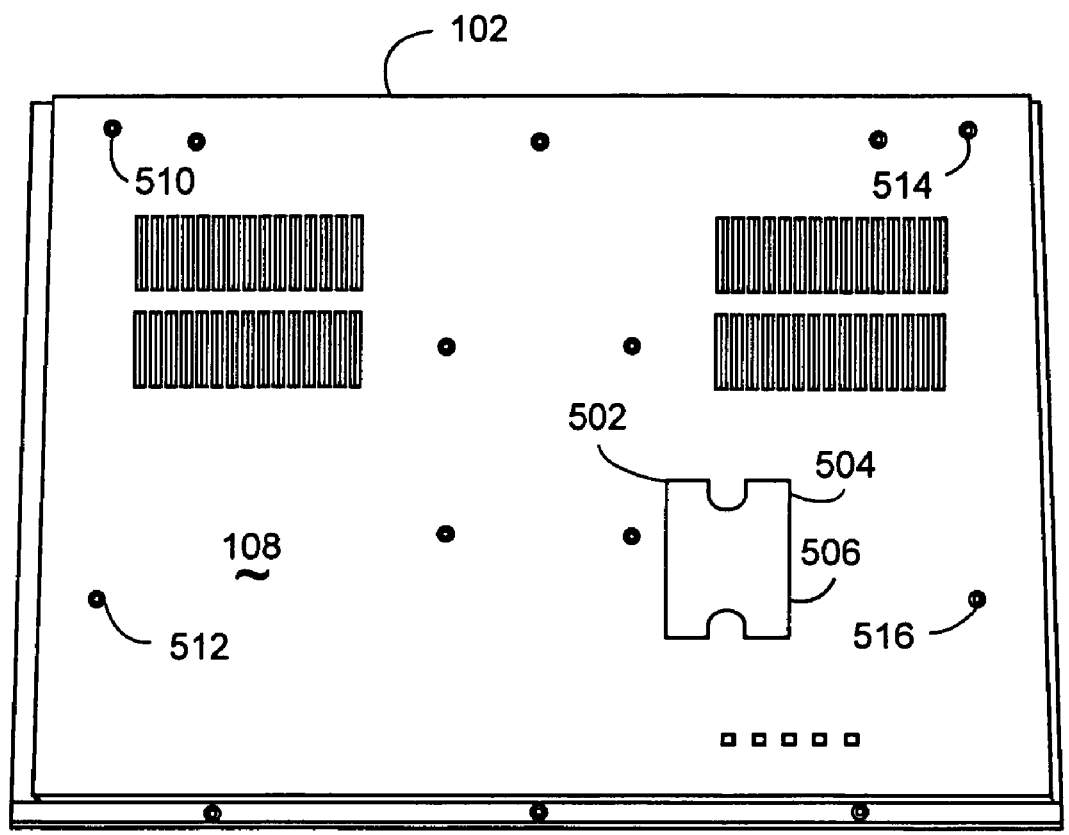
FIG. 5 shows a back view of the display module.

Referring now to FIG. 5, the posterior panel 108 of processor module 102 is shown with a $2^{nd}$ socket aperture 502. a $2^{nd}$ connector PC board 504 is mounted within the aperture 502 by screws connected to two mounting tabs 506 projecting inward from opposite edges of aperture 502. The display module connector assembly 508 is mounted to the PC board 504 and positioned and aligned relative to display module screw mounting holes 510–514 so that the display module connector 508 is positioned and aligned to physically and electrically engage and disengage with the processor module connector 304 when the processor module flange apertures are aligned with the respective display module mounting holes 510–514 and the modules 102 and 104 are moved along the engagement plane 302 from the mounted position shown in FIG. 1 to the separated position shown in FIG. 3.

Figure 6:
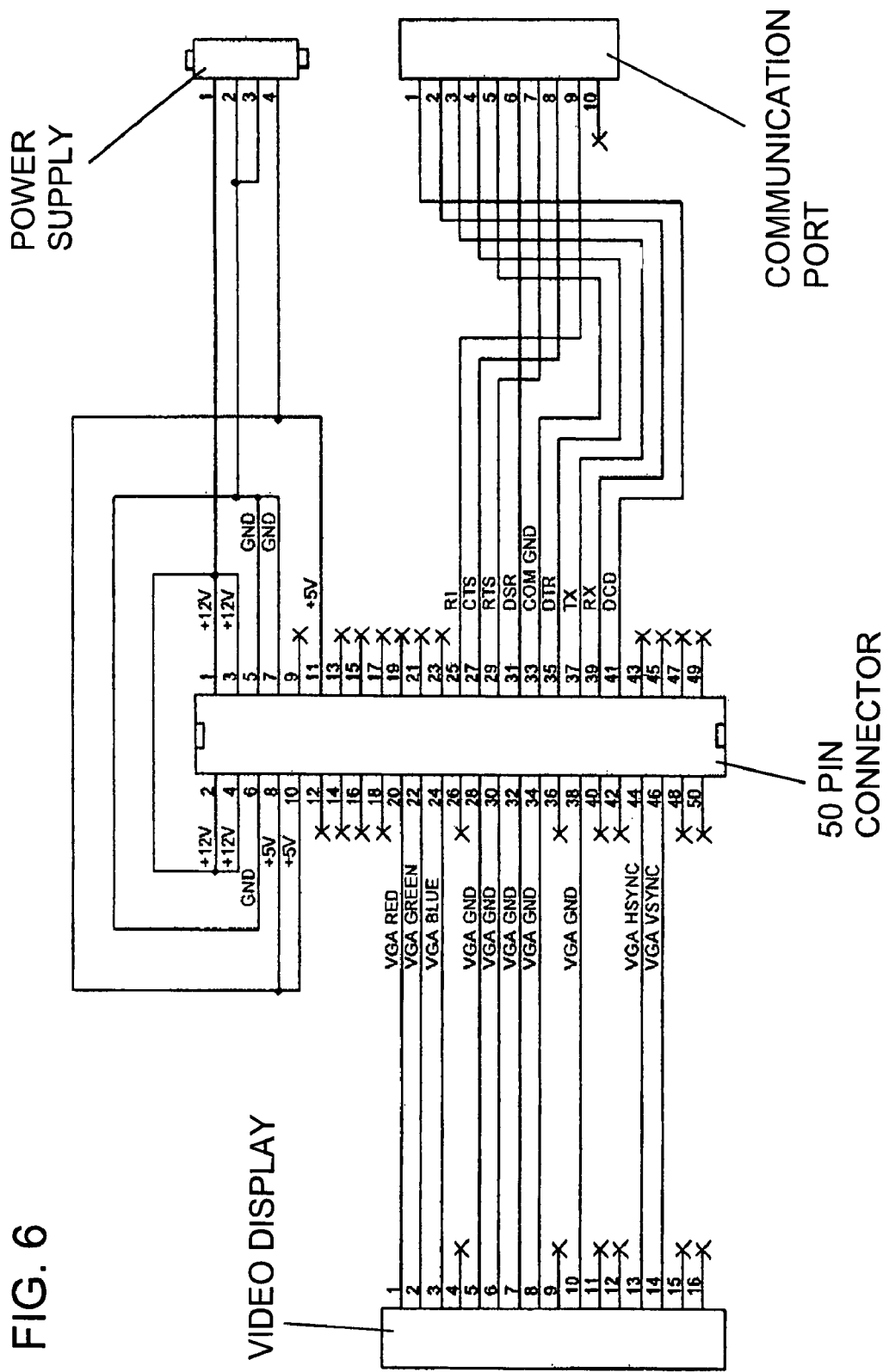
FIG. 6 shows an example plug embodiment used to connect the modules of FIG. 1.

It is well know in the art to assemble computer systems. Therefore one skilled in the art could easily select and assemble the components required to make the processor module and the display module. One feature of the invention includes a single plug connection between the modules. An example plug is seen in FIG. 6, which sets forth an example pin assignment. The pins are preferably configured to allow the plugs to be coupled in only the correct orientation. The plug preferably includes all of the electrical connections needed for power and communication between the display module 102 and the processor module 104. One skilled in the art could easily modify the plug configuration shown as required for the particular computer configuration used.

In one embodiment of the invention depicted in FIG. 1–6, computer subassemblies and functional components are each characterized by a respective measure of a reliability characteristic, for example, mean-time-to-failure. The subassemblies and functional components are apportioned into one or anther of the modules 102 and 104 according the rank of the reliability measure, i.e., those subassemblies and functional modules with lower values of mean-time-to-failure, (i.e., microprocessor chip and chip set, RAM, ROM and fixed storage drives) are segregated into one group from those of high values of mean-time-to-failure, (e.g, the LCD display 114 and components) which are segregated into another group. The two segregated groups are mounted in the two detachable modules 102 and 104 so that the lower reliability functions of the first group in the processor module 102 can be easily detached from the higher reliability functions of the second group in the display module 104, and can be readily replaced in the case of the more frequent failure incident expected in the low reliability functions contained in the processor module 104.

In an alternate embodiment of the invention computer subassemblies and functional components are each characterized by a likelihood that the component will be upgraded. The subassemblies and functional components are apportioned into one or anther of the modules 102 and 104 according the rank of the likelihood that the component will be replaced by an upgrade.

The uniaxial, simultaneous mechanical and electrical connection and disconnection for the detachable modules of the present computer invention imparted by the parallel alignment of cooperating electrical socket members and fastener members provided by the present detachable module computer invention affords a reduction of operational computer down time and reduction of maintenance cost compared to previous interconnection methods.

Therefore, the components most likely to break are grouped into a single module that can be easily replaced. Lower skilled technicians can be trained to determine in which module the problem lies, then merely replace the module, and bring the broken module back to a central repair facility where more highly trained technicians can fix the module. This allows a more efficient use of the higher trained technicians time, as travel time to client facilities is eliminated for the higher paid employees. Segregation of components into modules based on reliability allows for more efficient stocking of components.

The preferred embodiments described herein are illustrative only, and although the examples given include much specificity, they are intended as illustrative of only a few possible embodiments of the invention. Other embodiments and modifications will, no doubt, occur to those skilled in the art. The examples given should only be interpreted as illustrations of some of the preferred embodiments of the invention, and the full scope of the invention should be determined by the appended claims and their legal equivalent.

What is claimed is:

1. A computer assembly, consisting of:
   a display module fastening through a posterior panel by N screw holes aligned to said N of flange apertures near said N of the corners of a processor module by said N of screws; wherein said N is at least four; and
   said display module electrically coupling to said processor module through a socket aligned to a first electrical connection socket assembly member to a counterpart connector assembly member;
   wherein said display module, includes: an anterior surface opposite facing said posterior panel;
   wherein said posterior panel, includes:
      said N of said screw holes; and
      said first electrical connection socket assembly;
   wherein said anterior surface, includes: a LCD display panel;
   wherein said processor module, includes:
      a frontal surface for engaging said posterior panel, and including: said counterpart connector assembly member;
      a first lateral side panel opposite a second lateral side panel; wherein said first lateral side panel couples to two of said N of said flange apertures near two of said N corners of said processor module; and where said second lateral side panel couples to the remaining of said N corners.

2. The computer assembly as set forth in claim 1 wherein said processor module, further comprising:
   a processor;
   a random access memory; and
   a storage memory; and
   wherein said processor module further comprises at least one peripheral access port disposed on another outer surface.

3. The computer assembly as set forth in claim 2,
   wherein said display module electrically coupling to said processor module, further comprises:
   said LCD display electrically coupling to said processor through said first electrical connection socket assembly member electrically coupling to said counterpart connector assembly member.

4. The computer assembly as set forth in claim 1, wherein said display module is engaged to said processor module through movement in an engagement plain perpendicular to said posterior panel.

5. A modular computer, comprising: said computer assembly of claim 1;
   wherein said processor module has a lower measure of reliability than said display module.

6. The modular computer as set forth in claim 5,
   wherein said modular computer comprising:
   at least two computer functions segmented into a set of separate functional modules each categorized with a measure of a reliability characteristic:
   wherein said processor module includes a first portion of said set of said separate functional modules if said functional module reliability characteristic measure is below a selected limit value; and
   wherein said display module includes the remaining portion of said set of said separate functional modules if said functional module reliability characteristic measure is above said selected limit value.

* * * * *